United States Patent
Vaccari (10) Patent No.: US 9,364,994 B2
(45) Date of Patent: Jun. 14, 2016

(54) METHOD AND DEVICE FOR WELDING PROFILED ELEMENTS MADE OF A PLASTIC MATERIAL, IN PARTICULAR PVC

(71) Applicant: Graf Synergy S.r.l., Nonantola (IT)

(72) Inventor: Andrea Vaccari, Nonantola (IT)

(73) Assignee: Graf Synergy S.r.l., Nonantola (MO) (IT)

( * ) Notice: Subject to any disclaimer, the term of this patent is extended or adjusted under 35 U.S.C. 154(b) by 0 days.

(21) Appl. No.: 14/765,569

(22) PCT Filed: Feb. 4, 2014

(86) PCT No.: PCT/IB2014/058769
§ 371 (c)(1),
(2) Date: Aug. 4, 2015

(87) PCT Pub. No.: WO2014/122572
PCT Pub. Date: Aug. 14, 2014

(65) Prior Publication Data
US 2015/0367568 A1  Dec. 24, 2015

(30) Foreign Application Priority Data

Feb. 5, 2013 (IT) .............................. MO2013A0024

(51) Int. Cl.
*B32B 37/00* (2006.01)
(Continued)

(52) U.S. Cl.
CPC .............................. *B29C 66/52431* (2013.01);
(Continued)

(58) Field of Classification Search
CPC ............ B29C 65/2015; B29C 65/2061; B29C 65/2092; B29C 65/305; B29C 66/52431; B29C 66/0224; B29C 66/02245; B29C 66/1162; B29C 66/322; B29C 66/326; B29C 66/72523; B29C 66/81411; B29C 66/81427; B29C 3/305
USPC ........ 156/73.5, 304.2, 304.5, 304.6, 502, 580
See application file for complete search history.

(56) References Cited

U.S. PATENT DOCUMENTS 5,855,720 A * 1/1999 Johnson .................. B29C 37/04
156/272.2

(Continued)

FOREIGN PATENT DOCUMENTS

DE      3039733      5/1982
(Continued)

OTHER PUBLICATIONS

International Search Report and the Written Opinion Dated Apr. 29, 2014 From the International Searching Authority Re. Application No. PCT/IB2014/058769.

*Primary Examiner* — James Sells (57) ABSTRACT

The method for welding profiled elements made of a plastic material, in particular PVC, comprises the steps of:
preparing two profiled elements (3) made of a plastic material, arranged with respective zones to be welded (4) facing one another;
heating the zones to be welded (4);
before the heating step, the step of making a groove (19) in correspondence to a peripheral edge of each of the zones to be welded (4);
coupling the zones to be welded (4) to one another, by pressing the profiled elements (3) against one another to keep the zones to be welded (4) in reciprocal contact, the step of coupling the zones to be welded (4) defining a sub-step of melting the zones to be welded (4) into one another to define a welding bead and comprising the sub-steps of:
arranging pressing means (27, 28) in correspondence to the grooves (19) to define, in collaboration with the grooves (19), a containing compartment (19*a*) of the welding bead, the pressing means (27, 28) comprising:
a first work surface (62) having a protruding portion (63); and
a second work surface (64) of final finishing; and
displacing the pressing means (27, 28) alternately between:
an idle position moved away from the profiled elements (3);
a first work position wherein the first work surface (62) is abutted on the grooves (19) with the protruding portion (63) located inside the containing compartment (19*a*) to deviate the welding bead towards the side walls (61) of the containing compartment (19*a*); and
a second work position wherein the second work surface (64) is abutted on the grooves (19) so as to obtain a finished welding bead.

18 Claims, 7 Drawing Sheets

(51) Int. Cl.
  *B29C 65/00*     (2006.01)
  *B23C 3/30*      (2006.01)
  *B29C 65/20*     (2006.01)
  *B29C 65/30*     (2006.01)
  *E06B 3/96*      (2006.01)
  *B29L 31/00*     (2006.01)
  *B29C 65/74*     (2006.01)
  *B29C 65/78*     (2006.01)

(52) U.S. Cl.
  CPC ............ *B23C 3/305* (2013.01); *B29C 65/2015* (2013.01); *B29C65/2061* (2013.01); *B29C 65/2092* (2013.01); *B29C 65/305* (2013.01); *B29C 66/0224* (2013.01); *B29C 66/02245* (2013.01); *B29C 66/1162* (2013.01); *B29C 66/322* (2013.01); *B29C 66/326* (2013.01); *B29C 66/72523* (2013.01); *B29C 66/8167* (2013.01); *B29C 66/81411* (2013.01); *B29C 66/81427* (2013.01); *B29C 66/81457* (2013.01); *E06B 3/9608* (2013.01); *B29C 65/749* (2013.01); *B29C 65/7841* (2013.01); *B29C 66/71* (2013.01); *B29L 2031/005* (2013.01); *Y10T 156/17* (2015.01)

(56) References Cited

U.S. PATENT DOCUMENTS

| 5,902,657 | A  | * | 5/1999  | Hanson | B29C 65/0618 156/73.5 |
| 7,122,088 | B2 | * | 10/2006 | Field  | B29C 65/0618 156/580  |
| 2007/0026191 | A1 | * | 2/2007 | Field | B29C 65/06 428/119 |
| 2009/0104399 | A1 | * | 4/2009 | Field | B29C 65/0618 428/119 |

FOREIGN PATENT DOCUMENTS

| EP | 0264052        | 4/1988  |
| EP | 1153693        | 11/2001 |
| EP | 1617033        | 1/2006  |
| GB | 2376657        | 12/2002 |
| JP | 03-176584      | 7/1991  |
| WO | WO 2014/122572 | 8/2014  |

* cited by examiner

METHOD AND DEVICE FOR WELDING PROFILED ELEMENTS MADE OF A PLASTIC MATERIAL, IN PARTICULAR PVC

RELATED APPLICATIONS

This application is a National Phase of PCT Patent Application No. PCT/IB2014/058769 having International filing date of Feb. 4, 2014, which claims the benefit of priority of Italian Patent Application No. MO2013A000024 filed on Feb. 5, 2013. The contents of the above applications are all incorporated by reference as if fully set forth herein in their entirety.

TECHNICAL FIELD

The present invention relates to a method and relative device for welding profiled elements made of a plastic material, in particular PVC.

BACKGROUND ART

In the state of the art, the PVC profiled elements, mainly used as window and door frames, are welded together by means of the melting of respective head surfaces in order to make a frame structure fittable to doors or windows.

In particular, the melting is done by heating the portions to be connected using suitable electric heating plates and then pressing the heated portions the one against the other to favour their welding.

Generally, the heated portions are the head extremities of the profiled elements, suitably cut at 45° to define e.g. a right-angled portion of a respective window or door frame.

This method is carried out by welding machines equipped with respective retaining members of the profiled elements, mobile in a reciprocal closer moving direction to bring the heated extremities to be welded into contact.

Other machines are equipped with finishing systems, suitable for removing the bead or welding bead which forms during the melting of the two profiled elements.

In fact, in correspondence to the joining line of the two profiled elements (surfaces cut at 45°), the portion of melted material in excess comes out and goes to form a bead protruding from the visible surface of the profiled elements.

For this reason, in order to give the finished door or window frame an appreciable aesthetic appearance, once welded, the profiled elements undergo a removal operation of the melted bead.

The known welding devices briefly described do however have major drawbacks mainly tied to the formation of the above-mentioned welding bead.

It must in fact be considered that the welding zone of the PVC profiled elements is not perfectly uniform and parallel to the reciprocal profiled element, and consequently, to make the faces even, a lot of material is melted with the consequent formation of an abundant bead, and there is consequently a lot of waste material to be removed.

Furthermore, the finishing jobs for removing the bead and cleaning the welding zone have a strong effect on the total time required to machine the door or window frame. It should be realized in fact that for every door or window frame welding operation, the profiled elements have to be subsequently machined. Furthermore, in the case of spoked profiled elements, the removal of said bead is very complicated.

Furthermore, the machinery used for the above-mentioned finishing operations is cumbersome and particularly expensive.

This results in the need to sustain additional costs and work times because of the presence of further cumbersome equipment and tools.

SUMMARY OF THE INVENTION

In this context, the technical aim underlying the present invention is to propose a method and relative device for welding profiled elements made of a plastic material, in particular PVC, which overcomes the drawbacks of the above-mentioned state of the art.

In particular, the object of the present invention is to provide a method and relative device for welding two profiled elements made of a plastic material, in particular PVC which are able to eliminate all subsequent additional operations suitable for removing the welding bead.

A further object of the present invention is to provide a method for welding profiled elements made of a plastic material, in particular PVC, that is fast and cheap compared to a welding line and subsequent cleaning.

The above objects are substantially achieved by a method and relative device for welding profiled elements made of a plastic material, in particular PVC, comprising the technical specifications stated in any of the enclosed claims.

BRIEF DESCRIPTION OF THE DRAWINGS

Other characteristics and advantages of the present invention will become more evident from the approximate but non-limitative description of a preferred, but not sole, embodiment of a method and relative device for welding profiled elements made of a plastic material, in particular PVC, illustrated in the annexed drawings wherein.

DESCRIPTION OF SPECIFIC EMBODIMENTS OF THE INVENTION

With particular reference to the figures enclosed, indicated by 1 is a device for welding profiled elements made of a plastic material, in particular PVC.

Such device implements a method for welding profiled elements made of a plastic material, in particular PVC, wherein are arranged at least two profiled elements 3, with respective zones to be welded 4 facing one another.

As will be better specified below according to the method, a groove 19 is made in correspondence to each zone to be welded 4 of the profiled elements 3 by means of a removal operation (milling, melting, chamfering, etc.).

Subsequently, the zones to be welded 4 are heated and coupled by pressing the profiled elements 3 one against the other to keep the zones to be welded 4 in reciprocal contact. This way, the grooves 19 of the two profiled elements 3 define a containing compartment 19a for containing a bead or welding bead produced during the melting of the respective profiled elements 3.

In the rest of the present description, a single welding device 1 will be illustrated suitable for welding the extremities of the two respective profiled elements. Nevertheless, the present invention can comprise a series of devices 1, each of which operating on a respective extremity of a profiled element 3. For example, to make a rectangular frame to be used as a door or window frame, four devices 1 are used, each intended to weld the profiled elements 3 in correspondence to right angles of the mentioned frame.

Figure 1A:
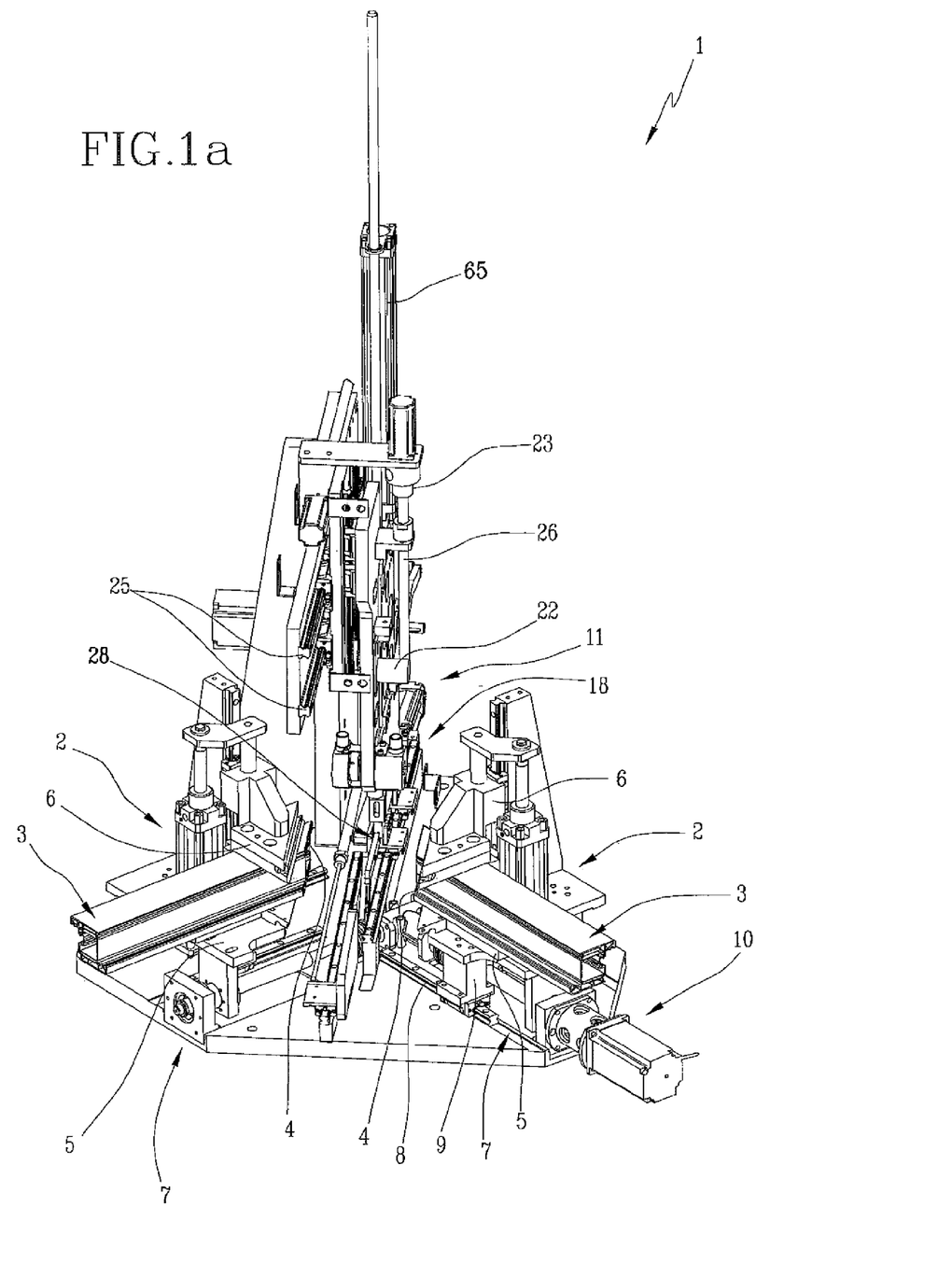
FIGS. 1a and 1b show perspective and schematized views of a one-head device (the heads can be repeated on machines which work 4-6 corners simultaneously) for welding profiled elements made of a plastic material, in particular PVC, according to the present invention.
Figure 1B:
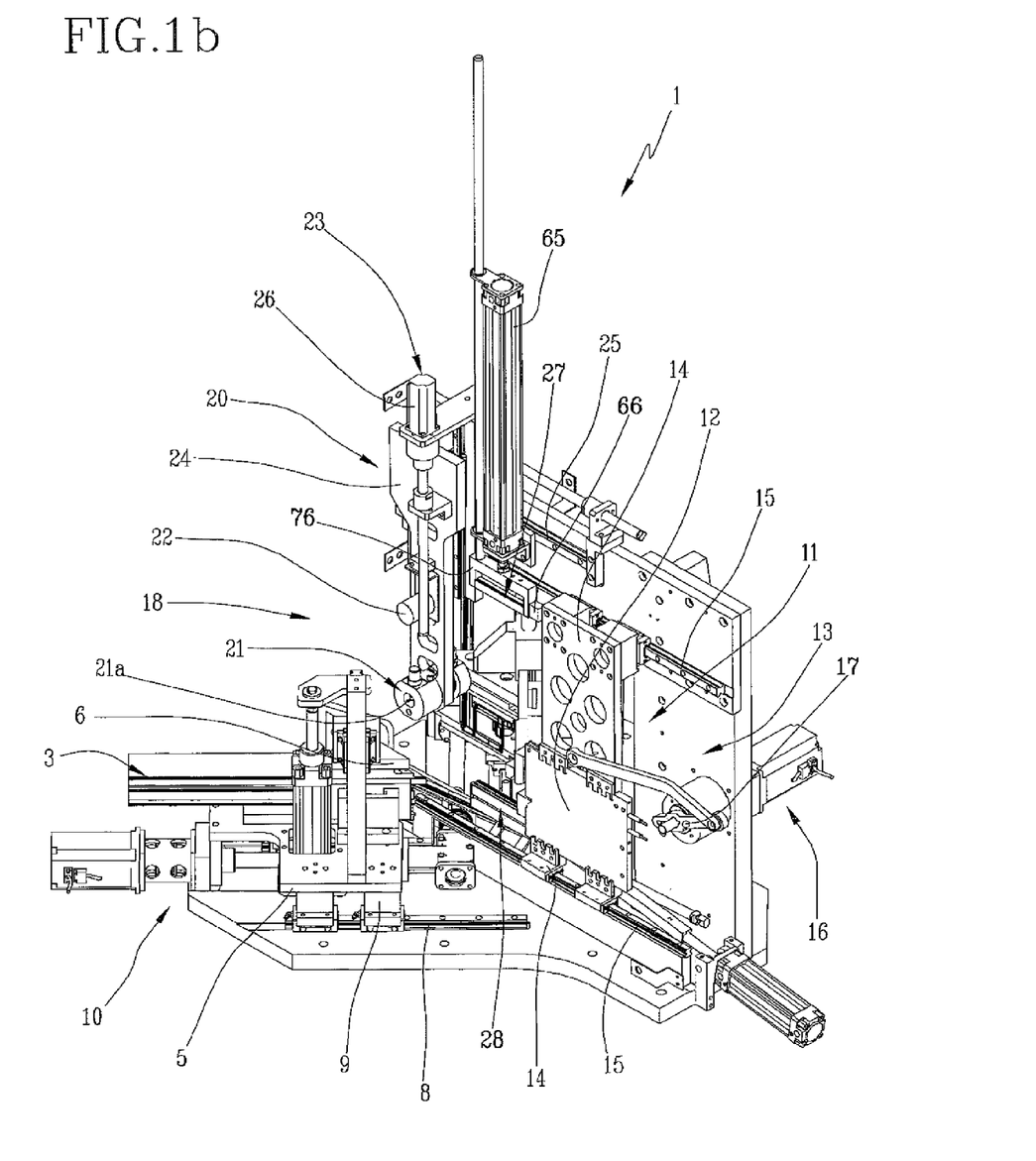
Figure 2A:
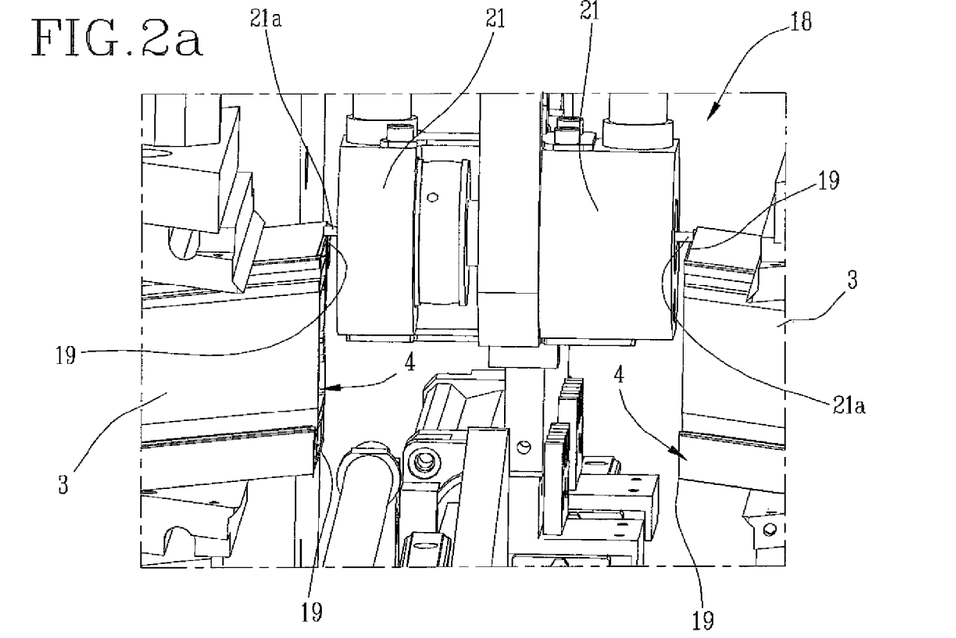
FIGS. 2a, 2b and 2c show details of the device in FIGS. 1a and 1b in respective operating conditions.
Figure 2B:
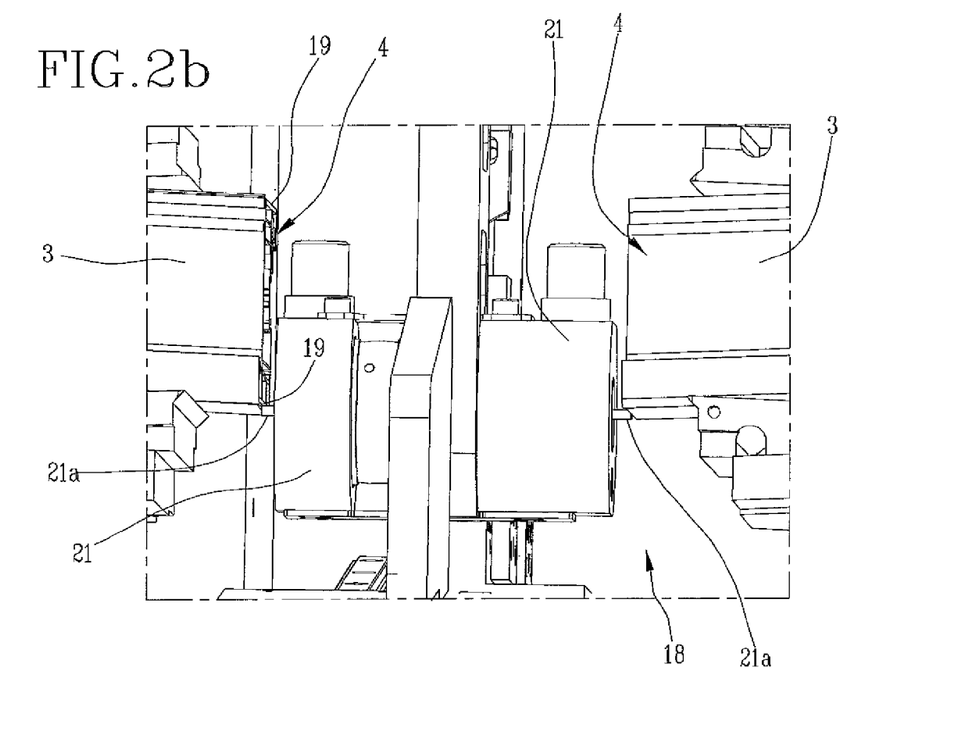
Figure 2C:
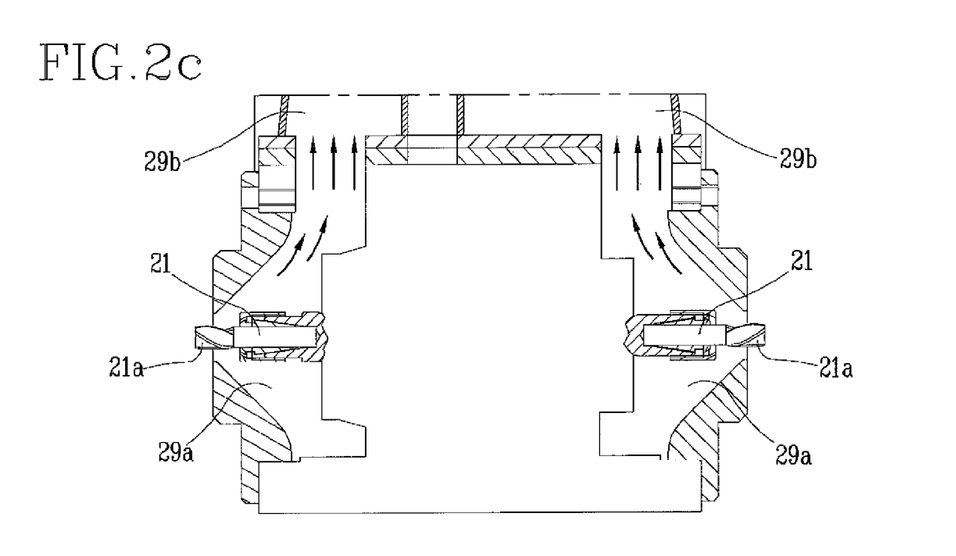
Figure 3:
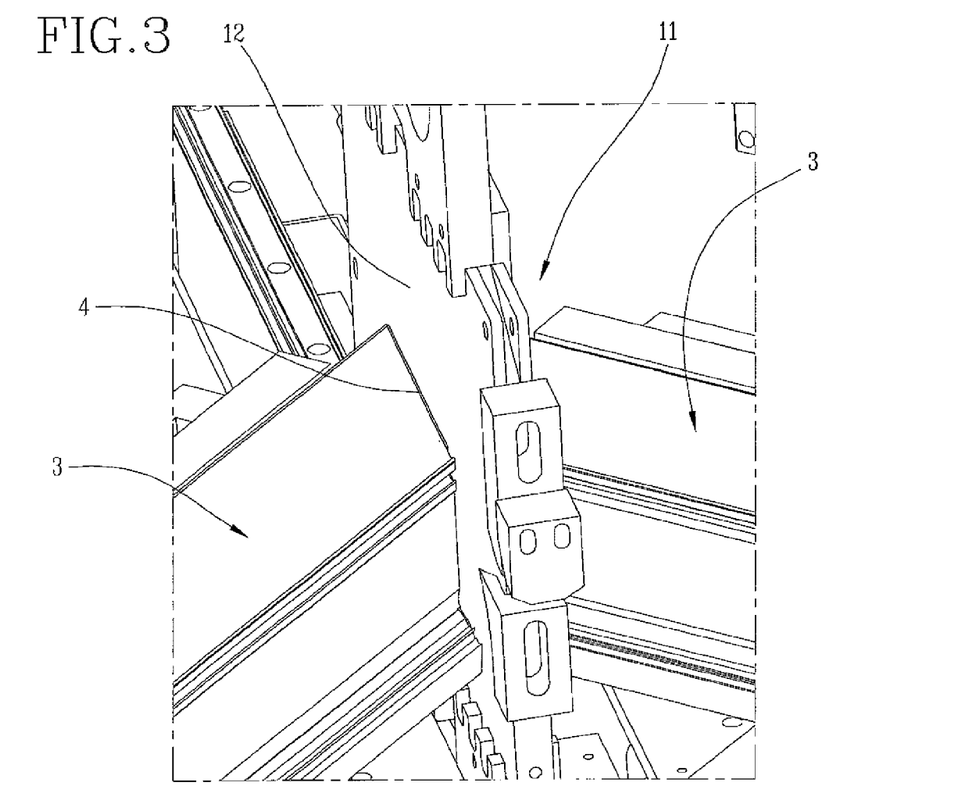
FIG. 3 show a detailed view of a further operating sequence.
Figures 4, 5:
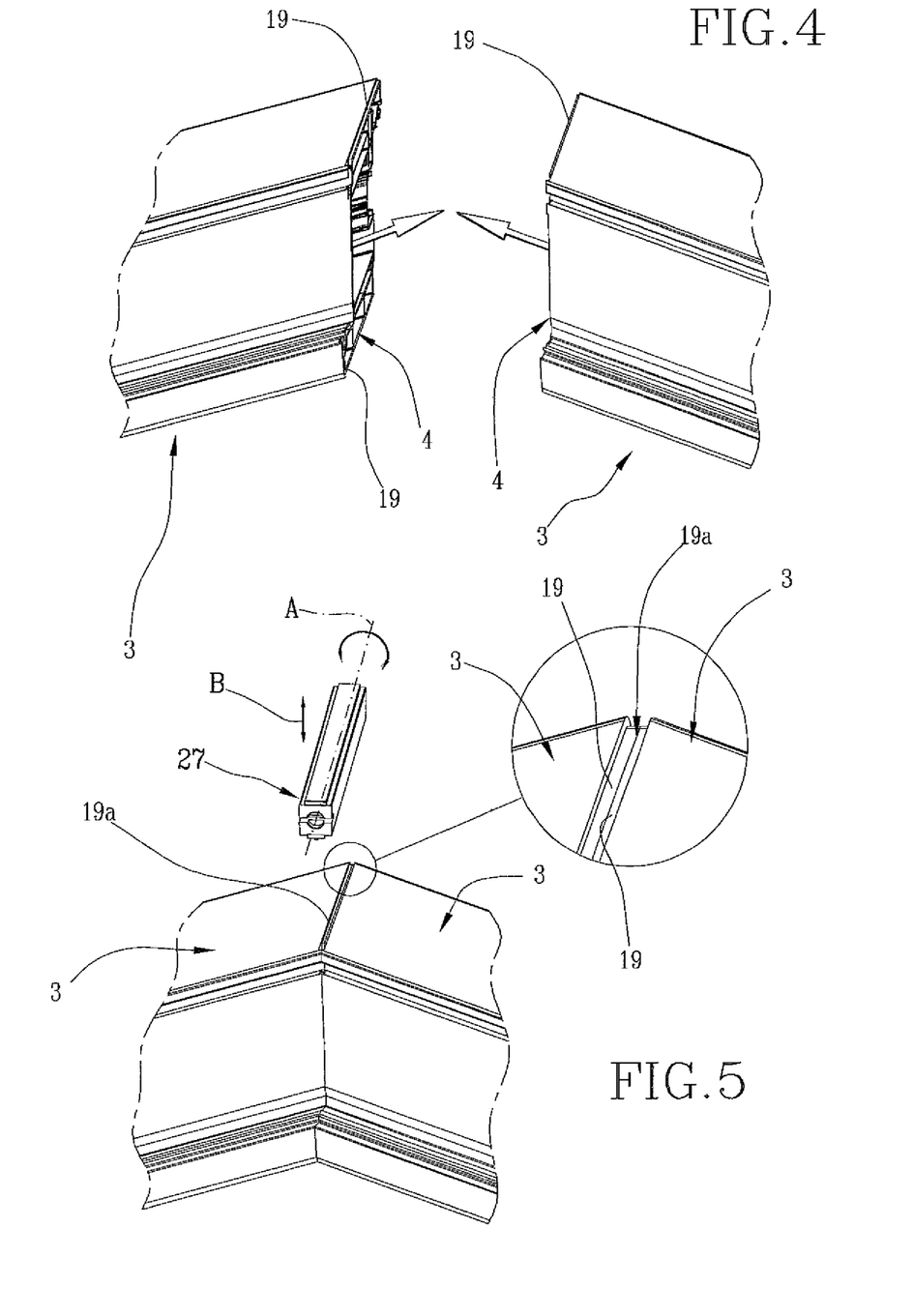
FIGS. 4 and 5 show profiled elements made of a plastic material during the steps of reciprocal moving closer.
Figure 6:
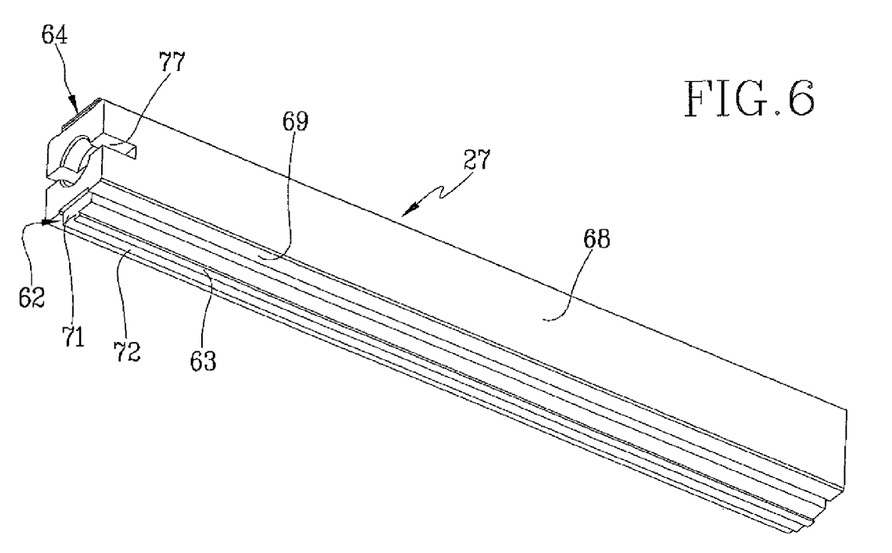
FIG. 6 shows a perspective view of a containing presser according to the invention.
Figure 7:
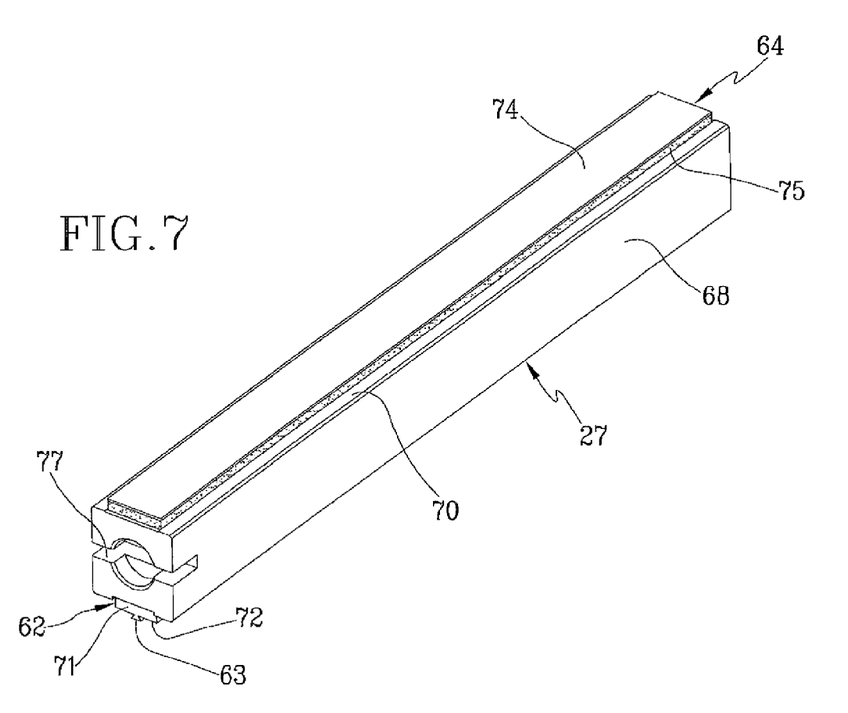
FIG. 7 shows a perspective view, from another angle, of the containing presser of FIG. 6.

With reference to FIG. 1 it should be noted that the device 1 comprises a pair of retaining members 2 of respective profiled elements 3 made of PVC, suitable for engaging the profiled elements 3 themselves with corresponding zones to be welded 4 facing one another.

In particular, each retaining member 2 comprises a base portion 5 on which the profiled element 3 is positioned, and a mobile portion 6 arranged above the base portion 5. The mobile portion 6 is suitably moved to shift towards the base portion 5 and thus retain the profiled element 3.

As can be seen on the attached illustrations, each profiled element 3 is therefore arranged between the base portion 5 and the mobile portion 6, with the respective head extremity protruding. The head extremities of the profiled elements make up the zones to be welded 4 and for this reason they are facing one another.

It should also be noted that the zones to be welded 4 are suitably cut at 45° to define a coupling resulting between two right-angled profiled elements.

Moreover, the device 1 comprises movement means 7 of the retaining members 2, to shift the profiled elements 3 between a first reciprocal away position and a second reciprocal closer position wherein the zones to be welded 4 are coupled together.

In particular, for each retaining member 2, the movement means 7 have a sliding guide 8, extending parallel to the longitudinal extension of the profiled element 3. On the sliding guide is fitted a carriage 9 integral with the aforementioned base portion 5. Furthermore, each carriage 9 is coupled with a movement system 10 suitable for moving both the carriages 9 of the retaining members 2 reciprocally closer/away.

The device 1 also comprises heating means 11 for heating the aforementioned zones to be welded 4 of the profiled elements 3 made of PVC. The heating means 11 are preferably mobile between an active condition wherein they are placed between the profiled elements 3, and a non-use condition wherein they are moved away from the profiled elements 3.

In particular, it should be noted that when the profiled elements 3 are arranged by the movement means 7 in reciprocal away moving direction, they define a transit zone of the heating means 11. This way, once the zones to be welded 4 have been heated, the profiled elements 3 are moved closer together and pressed with the respective extremity heads against one another.

Advantageously, the heating means 11 comprise a hotplate heat-sealing element 12, made up e.g. of a substantially plate-shaped electric resistance, fitted on a movement element 13. Preferably, the movement element 13 is composed of a pair of carriages 14 mounted sliding in respective rails 15 and each of which arranged on opposite sides of the aforementioned resistance 12. This way, the resistance 12 is fastened to the carriages 14 and moved by these along the rails 15. The carriages 14 are also operatively connected to a motor 16, by means of a connecting rod-crank 17. Advantageously, the connecting rod-crank 17 transforms the rotary motion given by the motor 16 into a back and forth motion of the carriages 14 and of the resistance 12 to fit/remove the electric resistance 12 between/from the above-mentioned profiled elements 3. The device 1 is also equipped with removing means 18 to make at least one groove 19 on the peripheral edge of at least one zone to be welded 4.

The removing means 18 are, e.g., of the milling type and comprise a supporting frame 20 placed above the retaining members 2, and at least a machining tool 21, facing a profiled element 3 to make the above-mentioned groove 19 on the zone to be welded 4.

The tool 21 is moved in rotation by a motor part 22 preferably of the electric type and miniaturized, brushless sensorless motor with very high rotation speed. Furthermore, the tool 21 is moved by a movement member 23, between a first idle condition (position in which it is not placed between the profiled elements 3) and a second working condition in which it is placed between the profiled elements 3 made of PVC.

In greater detail, the removing means 18 by milling preferably comprise a pair of machining tools 21, each of which equipped with an active head 21a on the peripheral edge of a respective zone to be welded 4.

As illustrated in the detail views, the tools 21 are opposite one another to work at the same time on both the profiled elements 3.

In other words, the two tools 21 rotate around the same rotation axis on opposite sides of the supporting frame 20; this way, the movement of the supporting frame 20 permits controlling the forward movement of the tool 21 working on a zone to be welded 4 and of the other tool 21 working on another zone to be welded 4.

The groove 19 obtained by each tool 21 has a substantially stepped conformation in square, i.e., shaped at 90°, which extends along the entire extension of the zone to be welded 4.

The containing compartment 19a defined by bringing the grooves 19 made this way alongside is delimited by a base wall 60 and by a pair of opposite side walls 61.

The base wall 60 is substantially horizontal while the side walls 61 are substantially vertical.

Furthermore, the frame 20 has a supporting bar 24 arranged above the retaining members 2 and designed to support the tools 21 which in this situation are mounted on a lower extremity of the bar 24 itself.

The bar 24 is operatively connected to the movement member 23 to be moved in correspondence to the zones to be welded 4.

Advantageously, the tools 21 are positioned in correspondence to the side edge of the zone to be welded 4 by means of the movement of the above-mentioned movement member 23.

In particular, the member 23 comprises a pair of supporting guides 25 on which the bar 24 is mounted sliding and moved by a known motor not described in detail.

Furthermore, the bar 24 is moved vertically by means of an axis with wormscrew 26 arranged in correspondence to the frame 20.

Advantageously, both the tools 21 and the motor part 22 are supported by the bar 24 and are mobile with it both horizontally (along the guides 25) and vertically (by means of the wormscrew 26).

The device 1 also has a vortex suction system 29a, 29b concentric with the tool 21 which permits removing the shavings which form during the removal operation by milling.

The suction system 29a, 29b, e.g., consists of a chamber 29a which is arranged around each tool 21 and which is connected to a suction duct 29b which moves the shavings away.

For this purpose, furthermore, the tool 21 consists of a helical-shaped cutter that conveys the removed shavings towards the inside of the chamber 29a to make suctioning the shavings easier.

Advantageously, all the shavings in plastic material produced by the removal operation by milling are easily suctioned.

The device 1 also has pressing means 27, 28 suitable for abutting on the grooves 19 to define, in collaboration with the grooves themselves, the containing compartment 19a.

The pressing means 27, 28, in fact, are meant to close the side of the containing compartment 19a opposite the base wall 60 and adjacent to the side walls 61, so as to prevent any melted material coming out of the compartment itself. The pressing means 27, 28, in particular, comprise:
- at least a first work surface 62 having a protruding portion 63; and
- at least a second work surface 64 of final finishing.

The pressing means 27, 28 cooperate with the operating means 65, 66 suitable for displacing the pressing means 27, 28 alternately between:
- an idle position moved away from the profiled elements 3;
- a first work position wherein the first work surface 62 is abutted on the grooves 19 with the protruding portion 63 located at least in part inside the containing compartment 19a to deviate the welding bead towards the side walls 61 of the containing compartment 19a; and
- a second work position wherein the second work surface 64 is abutted on the grooves 19 so as to obtain a finished welding bead.

The pressing means 27, 28 comprise at least a containing presser 27, 28 having both the first work surface 62 and the second work surface 64.

Alternative embodiments cannot however be ruled out wherein the first work surface 62 and the second work surface 64 are mounted on components distinct the one from the other and separately mobile.

In the embodiment of the device 1 shown in the illustrations, the pressing means 27, 28 comprise a pair of containing pressers 27, 28, facing one another on opposite sides (above and below) with respect to the plane on which the profiled elements 3 lie.

In particular, a first containing presser 27 is arranged above the profiled elements 3 and herein after may be called upper containing presser, while a second containing presser 28 is arranged below the profiled elements 3 and herein after may be called lower containing presser.

Both the containing pressers 27, 28 are mobile in reciprocal closer moving direction to define, in collaboration with the grooves 19, two containing compartments 19a obtained on opposite sides of the profiled elements 3 so as to contain and limit the material coming out of the compartments themselves.

It will in fact be noted that the grooves 19 are applied for the externally visible portions of the profiled elements 3, i.e., the upper and lower edges of the faces cut at 45° which when welded the one to the other determine the formation of a protruding welding bead.

In this situation, the bead does not come out of the containing compartment 19a but is contained inside it.

Each containing presser 27, 28 comprises a rod 68 which extends along a longitudinal direction A substantially parallel to the grooves 19.

In particular the longitudinal direction is substantially horizontal.

The rod 68 is rigid and made, e.g., of steel.

For each containing presser 27, 28, the rod 68 comprises a first longitudinal face 69 in correspondence to which the first work surface 62 is arranged and a second longitudinal face 70 in correspondence to which the second work surface 64 is arranged.

The first longitudinal face 69 and the second longitudinal face 70 are substantially opposite and parallel to one another.

The first work surface 62 is defined by an insert 71 associable with the first longitudinal face 69, e.g., by means of gluing.

The insert 71 is rigid and made, e.g., of hard plastic.

The first work surface 62 has a flat portion 72 from which the protruding portion 63 extends.

The protruding portion 63 extends longitudinally along the substantial totality of the rod 68.

In the transversal section, instead, the protruding portion 63 has a pair of cavities 73 which, in the first work position, are placed substantially facing the side walls 61 of the containing compartment 19a.

The presence of the cavities 73, in other words, results in the transversal section of the protruding portion 63 being in undercut.

More in detail, the protruding portion 63 has a transversal section substantially shaped like an isosceles trapezium with a projecting longer base.

In this respect, it is underlined that, within the scope of the present treatise, the expression "projecting longer base" means that the lesser base of the trapezium is defined in correspondence to the flat portion 72 while the isosceles sides of the trapezium extend projecting from the flat portion 72 and stretch underneath the longer base of the trapezium which, therefore, with respect to the flat portion 72, is placed in distal position.

In this embodiment, the cavities 73 of the transversal section of the protruding portion 63 are defined between the isosceles sides of the trapezium and the flat portion 72.

Alternative embodiments cannot however be ruled out wherein the transversal section of the protruding portion has a different conformation.

Figures 8, 9, 10, 11, 12:
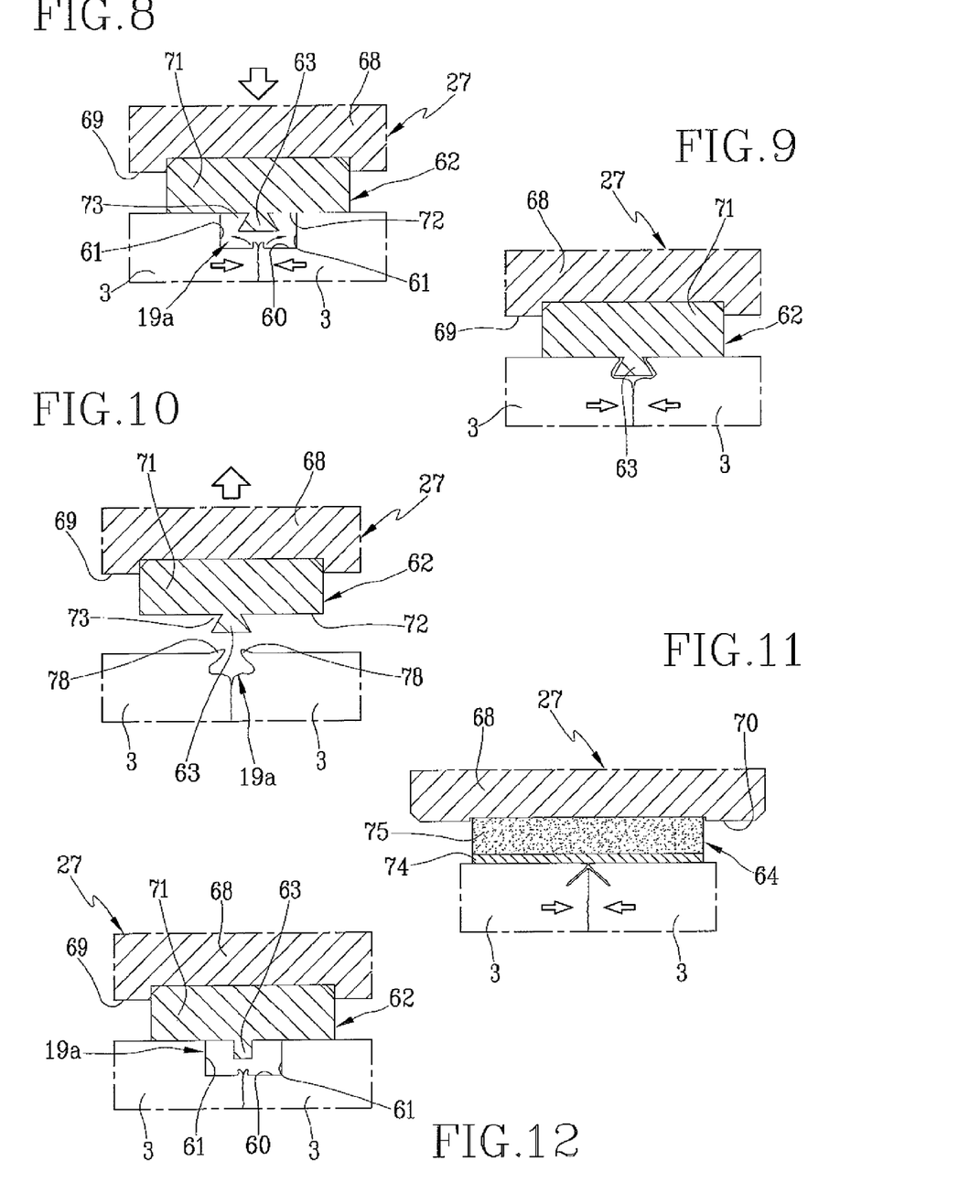
FIGS. 8, 9, 10 and 11 schematically show the subsequent steps of the welding of the head extremities of the profiled elements according to the invention, wherein the use of the containing presser in FIGS. 6 and 7 is highlighted which allows to contain the bead inside the containing compartment.
FIG. 12 shows a transversal section view of an alternative embodiment of the containing presser.

The FIG. 12, e.g., shows an embodiment wherein the transversal section of the protruding portion 63 is substantially rectangular.

The second work surface 64 is defined by a sheet-shaped element 74 suitable for abutting on the grooves 19 and by a shock-absorbing element 75 supporting the sheet-shaped element 74.

The sheet-shaped element 74 consists, e.g., of a metal blade of reduced thickness or flexible hard plastic.

The shock-absorbing element 75, on the other hand, is a layer made of a yielding material, e.g., rubber, placed between the second longitudinal face 70 and the sheet-shaped element 74.

In the embodiment shown in the illustrations, the second work surface 64 is substantially flat and permits obtaining a substantially flat finished welding bead.

Alternative embodiments cannot however be ruled out wherein the second work surface 64 has protrusions and/or recesses to reproduce a particular shape on the hot piece that has just been worked. The still hot material, in fact, is easily pliable.

It is also easy to appreciate that in the presence of profiled elements 3 with spoked visible surfaces, the first work surface 62 and the second work surface 64 are shaped so as to follow the form of the visible surfaces.

In this respect, it is underlined that, usefully, the containing pressers 27, 28 are releasable from the rest of the device 1 and replaceable with containing pressers 27, 28 having diversified shapes depending on the type of profiled elements 3 to be welded.

The operating means 65, 66 comprise at least a shift unit 65 to shift the pressing means 27, 28 along a direction B transversal to the direction of movement of the profiled elements 3.

The transversal direction B is substantially at right angles to the plane on which the profiled elements 3 lie and, therefore, vertical.

The FIGS. 1a and 1b show in detail only the shift unit 65 meant to translate the upper containing presser 27.

Such shift unit 65 is defined by a vertical pneumatic cylinder having a mobile extremity to which a supporting element 76 is fitted.

Alternative embodiments of the shift unit 65 are however also possible.

The operating means 65, 66 also comprise at least a rotation unit 66 suitable for rotating the rod 68 of the containing pressers 27, 28 around the longitudinal direction A and alternately turning the first work surface 62 and the second work surface 64 towards the grooves 19.

Considering that the first work surface 62 and the second work surface 64 are mounted on opposite faces of the rod 68, then the rotation unit 66 is suitable for rotating the rod 68 around itself by 180°.

Alternative embodiments cannot however be ruled out wherein the work surfaces 62, 64 are arranged on adjacent and contiguous faces of the rod 68, in which case the rotation of the rod 68 is reduced to just 90°.

The FIGS. 1a and 1b show in detail only the rotation unit 66 meant for the rotation of the upper containing presser 27.

Such rotation unit 66 is defined by a rotary motor positioned between the supporting element 76 and a grip extremity 77 of the rod 68.

Alternative embodiments are however possible for the rotation unit 66 such as, e.g., in the event of its consisting of a crank mechanism made by means of an actuator cylinder and a lever.

The device 1, described above in prevalently structural terms, implements a welding method which is the subject of the present invention.

The method comprises the steps of preparing at least two profiled elements 3, arranged with the respective zones to be welded 4 facing one another, in correspondence to the retaining members 2.

Then, the grooves 19 are made in correspondence to each zone to be welded 4 of the profiled elements 3.

The step of making the grooves 19 is performed by means of a removal operation of material on the peripheral edges defined by the head extremities of each profiled element 3.

This removal is done by milling by means of the tools 21.

During the removal step, a retention step is performed of the shavings by means of the tool 21 with helical shape and the axial suction which conveys the removed shavings towards the inside of the chamber 29a.

The zones to be welded 4 are subsequently heated, by pressing them on the opposite sides of the hot-plate heat-sealing element 12, and coupled together by pressing the profiled elements 3 one against the other.

The coupling of the zones to be welded 4 occurs keeping them in reciprocal contact to melt them together and define the welding bead.

During the coupling of the zones to be welded 4, the sub-step is performed which consists in arranging the pressing means 27, 28 in correspondence to the grooves 19 to define, in collaboration with the grooves themselves, the containing compartments 19a of the welding bead.

Such sub-step occurs by means of the operating means 65, 66, which alternately move the pressing means 27, 28 among the idle position, the first work position and the second work position.

In such sub-step, both the containing pressers 27, 28 operate, and are arranged on opposite sides, above and below the profiled elements 3.

The FIGS. 8, 9, 10 and 11 show the operation of only the upper containing presser 27, but it is easy to appreciate by analogy also that of the lower containing presser 28.

Once the zones to be welded 4 have been brought closer together, the containing pressers 27, 28 are moved from the idle position to the first work position thanks to the operation of the shift units 65 which move the pressing means along the transversal direction B.

This way, the first work surface 62 of each containing presser 27, 28 abuts on the grooves 19 with the protruding portion 63 inside the relative containing compartment 19a (FIG. 8).

The welding bead created by the relative closer moving of the profiled elements 3 stands up at the centre of the containing compartment 19a until it comes into contact with the protruding portion 63, which deviates it towards the side walls 61 until the cavities 73 have been filled (FIG. 9).

The presence of the protruding portion 63 is crucial for the purpose of completely and correctly filling the entire containing compartment 19a with the melted plastic material forming the welding bead.

In this respect, it is underlined that in the absence of the protruding portion 63 the welding bead tends to remain at the centre of the containing compartment 19a and reach the side walls 61 much later, when the material has already started to solidify, determining a filling of the containing compartment 19a which is not always optimal and, in any case, in a non-functional way.

Subsequently, the containing pressers 27, 28 are moved away from the profiled elements 3 along a transversal direction B.

The undercut defined by the trapezoid shape of the protruding portion 63 determines a slight lifting of the two lips 78 of the plastic material which had previously occupied the cavities 73 and which, being still in a softened state, is easily deformable (FIG. 10).

At this point, the containing pressers 27, 28 are moved and made to rotate around the longitudinal direction A to turn the second work surface 64 towards the grooves 19 instead of the first work surface 62, and moved closer to the profiled elements 3 until they are arranged in the second work position.

In this position, the sheet-shaped element 74 pushes downwards and evens out the lips 78 which had previously lifted up and curbs any outward thrusts by the welding bead.

In this step in fact, the zones to be welded 4 of the profiled elements 3 continue to move closer and the melted plastic material continues to form until the containing compartment 19a is completely full and the lips 78 are alongside (FIG. 11).

All the sub-steps shown in the FIGS. 8, 9, 10 and 11 are performed quickly and within times such as to prevent the solidification of the melted material before the containing compartment 19a is completely full.

In this respect it is underlined that in the second work position the presence of the shock-absorbing element 75 permits distributing, in a uniform and homogeneous way along the entire containing compartment 19a, any internal pressure produced inside the grooves 19 during the operation.

The present invention achieves the proposed objects.

In particular, the possibility of maintaining the welding bead inside the containing compartment defined by the two grooves prevents excess material coming out.

Consequently, all the surface finishing jobs suitable for removing excess material are eliminated, with the consequent advantages in terms of time, energy and saving relating to the use of further machinery.

To this must be added that, thanks to the alternate intervention of the first work surface with protruding portion and of the second work surface of final finishing, the end result on the profiled elements is aesthetically excellent and far superior to any welding method and device of known type.

What is claimed is:

1. A method for welding profiled elements made of a plastic material, in particular PVC, comprising the steps of:
   preparing at least two profiled elements (3) made of a plastic material, arranged with respective zones to be welded (4) facing one another;
   heating said zones to be welded (4);
   coupling the zones to be welded (4) to one another, by pressing the profiled elements (3) against one another to keep the zones to be welded (4) in reciprocal contact;
   said step of coupling the zones to be welded (4) defining a sub-step of melting the zones to be welded (4) into one another to define a welding bead;
   wherein said method comprises, before the heating step, the step of making a groove (19) in correspondence to a peripheral edge of each of said zones to be welded (4), said step of coupling the zones to be welded (4) comprising the sub-steps of:
   arranging pressing means (27, 28) in correspondence to said grooves (19) to define, in collaboration with said grooves (19), at least a containing compartment (19a) of said welding bead, said pressing means (27, 28) comprising:
   at least a first work surface (62) having a protruding portion (63); and
   at least a second work surface (64) of final finishing; and
   displacing said pressing means (27, 28) alternately between:
   an idle position moved away from said profiled elements (3);
   a first work position wherein said first work surface (62) is abutted on said grooves (19) with said protruding portion (63) located at least in part inside said containing compartment (19a) to deviate said welding bead towards the side walls (61) of said containing compartment (19a); and
   a second work position wherein said second work surface (64) is abutted on said grooves (19) so as to obtain a finished welding bead.

2. Method according to the claim 1, wherein said step of making the groove (19) is performed by means of a removal operation of said plastic material.

3. Method according to claim 1, wherein said displacing comprises moving said pressing means (27, 28) along a direction (B) transversal to the direction of movement of the profiled elements (3).

4. Method according to claim 1, wherein said displacing comprises rotating said pressing means (27, 28) along a longitudinal direction (A) parallel to said grooves (19) and turning alternately said first work surface (62) and said second work surface (64) towards said grooves.

5. Method according to claim 1, wherein said arranging the pressing means (27, 28) comprises arranging a pair of containing pressers (27, 28), facing one another, on opposite sides with respect to the lying plane of said profiled elements (3) and both moving closer reciprocally to one another so as to define, in collaboration with said grooves (19), two containing compartments (19a) obtained on opposite sides of said profiled elements (3).

6. Device (1) for welding profiled elements made of a plastic material, particularly PVC, comprising:
   a pair of retaining members (2) of respective profiled elements (3) made of a plastic material, to engage said profiled elements (3) with corresponding zones to be welded (4) facing one another;
   heating means (11) of said zones to be welded (4) of the profiled elements (3), moving between an active condition wherein the heating means (11) are placed between the profiled elements (3) and a non-use condition wherein the heating means (11) are moved away from said profiled elements (3);
   movement means (7) of said retaining members (2) to displace the profiled elements (3) between a first reciprocal away moving position and a second reciprocal close moving position wherein the zones to be welded (4) are coupled to one another;
   wherein said device (1) comprises:
   removing means (18) to make at least a groove (19) on a peripheral edge of each of said zones to be welded (4);
   pressing means (27, 28) suitable for abutting on said grooves (19) to define, in collaboration with said grooves (19), a containing compartment (19a) of a welding bead, said pressing means (27, 28) comprising:
   at least a first work surface (62) having a protruding portion (63); and
   at least a second work surface (64) of final finishing; and
   operation means (65, 66) to displace said pressing means (27, 28) alternately between:
   an idle position moved away from said profiled elements (3);
   a first work position wherein said first work surface (62) is abutted on said grooves (19) with said protruding portion (63) located at least in part inside said containing compartment (19a) to deviate said welding bead towards the side walls (61) of said containing compartment (19a); and
   a second work position wherein said second work surface (64) is abutted on said grooves (19) so as to obtain a finished welding bead.

7. Device (1) according to claim 6, wherein said pressing means (27, 28) comprise at least a containing presser (27, 28) having both said first work surface (62) and said second work surface (64).

8. Device (1) according to the claim 7, wherein said containing presser (27, 28) comprises a rod (68) which extends along a longitudinal direction (A) substantially parallel to said grooves (19), said rod (68) comprising a first longitudinal face (69) in correspondence to which is arranged said first work surface (62) and a second longitudinal face (70) in correspondence to which is arranged said second work surface (64).

9. Device (1) according to the claim 8, wherein said first longitudinal face (69) and said second longitudinal face (70) are substantially opposite and parallel to one another.

10. Device (1) according to the claim 8, wherein said operation means (65, 66) comprise at least a rotation unit (66) suitable for rotating said rod (68) around said longitudinal direction (A) and for turning alternately said first work surface (62) and said second work surface (64) towards said grooves.

11. Device (1) according to claim 6, wherein said operation means (65, 66) comprise at least a shift unit (65) to shift said pressing means (27, 28) along a direction (B) transversal to the direction of movement of the profiled elements (3).

12. Device (1) according to the claim 11, wherein said transversal direction (B) is substantially at right angles to the lying plane of said profiled elements (3).

13. Device (1) according to claim 6 wherein said protruding portion (63) has a transversal section having a pair of cavities (73) which, in said first work position, face said side walls (61) of the containing compartment (19*a*).

14. Device (1) according to the claim 13, wherein said protruding portion (63) has a transversal section substantially shaped like an isosceles trapezium with a projecting longer base.

15. Device (1) according to claim 6, wherein said protruding portion (63) has a substantially rectangular transversal section.

16. Device (1) according to claim 6, wherein said second work surface (64) is defined by a sheet-shaped element (74) suitable for abutting on said grooves (19) and by a shock-absorbing element (75) supporting said sheet-shaped element (74) and made of a yielding material.

17. Device (1) according to claim 6, wherein said containing presser (27, 28) can be released and replaced with a containing presser (27, 28) having diversified shapes depending on the type of said profiled elements (3).

18. Device (1) according to claim 7, wherein said pressing means (27, 28) comprise a pair of said containing pressers (27, 28), facing one another on opposite sides with respect to the lying plane of said profiled elements (3) and both moving close reciprocally to one another so as to define, in collaboration with said grooves (19), two of said containing compartments (19*a*) obtained on opposite sides of said profiled elements (3).

\* \* \* \* \*